United States Patent
Sarkar et al.

(10) Patent No.: US 11,416,004 B2
(45) Date of Patent: Aug. 16, 2022

(54) SYSTEM AND METHOD FOR VALIDATING READINGS OF ORIENTATION SENSOR MOUNTED ON AUTONOMOUS GROUND VEHICLE

(71) Applicant: Wipro Limited, Bangalore (IN)

(72) Inventors: Manas Sarkar, Barasat (IN); Balaji Sunil Kumar, Bengaluru (IN)

(73) Assignee: Wipro Limited, Bangalore (IN)

( * ) Notice: Subject to any disclaimer, the term of this patent is extended or adjusted under 35 U.S.C. 154(b) by 124 days.

(21) Appl. No.: 16/718,244

(22) Filed: Dec. 18, 2019

(65) Prior Publication Data

US 2020/0310460 A1 Oct. 1, 2020

(30) Foreign Application Priority Data

Mar. 28, 2019 (IN) .............................. 201941012222

(51) Int. Cl.
G05D 1/02 (2020.01)
G05D 1/00 (2006.01)
G06V 20/58 (2022.01)

(52) U.S. Cl.
CPC ......... G05D 1/0253 (2013.01); G05D 1/0088 (2013.01); G06V 20/58 (2022.01); G05D 2201/0213 (2013.01)

(58) Field of Classification Search
CPC ............... G05D 1/0253; G05D 1/0088; G05D 2201/021; G06K 9/00805; G06K 9/3241; G06K 9/00791
See application file for complete search history.

(56) References Cited

U.S. PATENT DOCUMENTS

| 9,268,335 | B2 | 2/2016 | Taira et al. | |
|---|---|---|---|---|
| 2014/0300732 | A1* | 10/2014 | Friend | G06T 7/73 348/135 |
| 2016/0377437 | A1* | 12/2016 | Brannstrom | G05D 1/0278 701/501 |
| 2018/0143647 | A1* | 5/2018 | Wang | G05D 1/0274 |
| 2021/0199437 | A1 | 7/2021 | Breed et al. | |

FOREIGN PATENT DOCUMENTS

| EP | 3109589 A1 | 12/2016 |
|---|---|---|
| IN | 201827028877 | 10/2018 |

\* cited by examiner

*Primary Examiner* — Michael J Zanelli
(74) *Attorney, Agent, or Firm* — Finnegan, Henderson, Farabov, Garrett & Dunner, LLP (57) ABSTRACT

This disclosure relates to method and system for validating readings of orientation sensor mounted on autonomous ground vehicle (AGV). The method may include receiving distances and angles of observation of at least two fixed objects with respect to AGV at a first position and then at a second position, calculating a first orientation and a second orientation of AGV at the first position and at the second position respectively based on the distances, the angles of observation, and coordinate positions of each of the at least two fixed objects, determining an actual change in orientation of AGV based on the first orientation and the second orientation, and validating the readings of the orientation sensor based on the actual change in orientation. The at least two fixed objects are objects with pre-identified properties in a field of view of a vision sensor mounted on AGV and on both sides of AGV.

20 Claims, 8 Drawing Sheets

SYSTEM AND METHOD FOR VALIDATING READINGS OF ORIENTATION SENSOR MOUNTED ON AUTONOMOUS GROUND VEHICLE

TECHNICAL FIELD

This disclosure relates generally to autonomous ground vehicle (AGV) and more particularly to method and system for validating readings of an orientation sensor mounted on an AGV.

BACKGROUND

Autonomous ground vehicles (AGVs) are increasingly deployed in a variety of indoor and outdoor activities (e.g., manufacturing, logistics, commutation, etc.) so as to facilitate efficient transportation. An AGV may be capable of sensing the dynamic changing environment, and of accurately navigating without any human intervention. The task of sensing the dynamic changing environment may be therefore of utmost importance, and may typically require accurate information from a variety of sensors. For example, instant position and instant orientation with respect to a navigation map may be acquired using position sensor (e.g., global positioning system (GPS) sensor) and orientation sensor (e.g., inertial measurement unit (IMU) sensor) respectively. Further, for example, an instant three-dimensional (3D) image of the surroundings may be acquired using vision sensors, such as light detection and ranging (LiDAR) scanner, radio detection and ranging (RADAR) scanner, cameras, ultrasonic scanner, and so forth.

As will be appreciated, one or more sensors may get damaged, may malfunction, or may provide inappropriate results due to wear and tear or due to any other region. If not diagnosed correctly or timely, such sensors may cause unintended behavior by the AGV resulting in possible damage to the AGV and the environment. For example, failure of orientation sensor (e.g., IMU) may decrease the ability of the AGV to quickly and accurately determine its orientation and to navigate its environment confidently and precisely.

SUMMARY

A method of validating readings of an orientation sensor mounted on an autonomous ground vehicle (AGV). The method may include receiving a distance and an angle of observation of each of at least two fixed objects with respect to the AGV at a first position and then at a second position. The at least two fixed objects may be objects with pre-identified properties in a field of view of a vision sensor mounted on the AGV and on both sides of the AGV. The distance and the angle of observation may be determined based on data from the vision sensor. The method may further include calculating a first orientation and a second orientation of the AGV at the first position and at the second position respectively, based on the distance and the angle of observation of each of the at least two fixed objects with respect to the AGV at the first position and at the second position and coordinate positions of each of the at least two fixed objects on a navigation map. The method may further include determining an actual change in orientation of the AGV from the first position to the second position based on the first orientation and the second orientation. The method may further include validating the readings of the orientation sensor based on the actual change in orientation.

In one embodiment, a system for validating readings of an orientation sensor mounted on an AGV is disclosed. In one example, the system may include an orientation sensor validation device, which may include at least one processor and a memory communicatively coupled to the at least one processor. The memory may store processor-executable instructions, which, on execution, may cause the processor to receive a distance and an angle of observation of each of at least two fixed objects with respect to the AGV at a first position and then at a second position. The at least two fixed objects may be objects with pre-identified properties in a field of view of a vision sensor mounted on the AGV and on both sides of the AGV. The distance and the angle of observation may be determined based on data from the vision sensor. The processor-executable instructions, on execution, may further cause the processor to calculate a first orientation and a second orientation of the AGV at the first position and at the second position respectively, based on the distance and the angle of observation of each of the at least two fixed objects with respect to the AGV at the first position and at the second position and coordinate positions of each of the at least two fixed objects on a navigation map. The processor-executable instructions, on execution, may further cause the processor to determine an actual change in orientation of the AGV from the first position to the second position based on the first orientation and the second orientation. The processor-executable instructions, on execution, may further cause the processor to validate the readings of the orientation sensor based on the actual change in orientation.

In one embodiment, a non-transitory computer-readable medium storing computer-executable instructions for validating readings of an orientation sensor mounted on an AGV is disclosed. In one example, the stored instructions, when executed by a processor, may cause the processor to perform operations including receiving a distance and an angle of observation of each of at least two fixed objects with respect to the AGV at a first position and then at a second position. The at least two fixed objects may be objects with pre-identified properties in a field of view of a vision sensor mounted on the AGV and on both sides of the AGV. The distance and the angle of observation may be determined based on data from the vision sensor. The operations may further include calculating a first orientation and a second orientation of the AGV at the first position and at the second position respectively, based on the distance and the angle of observation of each of the at least two fixed objects with respect to the AGV at the first position and at the second position and coordinate positions of each of the at least two fixed objects on a navigation map. The operations may further include determining an actual change in orientation of the AGV from the first position to the second position based on the first orientation and the second orientation. The operations may further include validating the readings of the orientation sensor based on the actual change in orientation.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
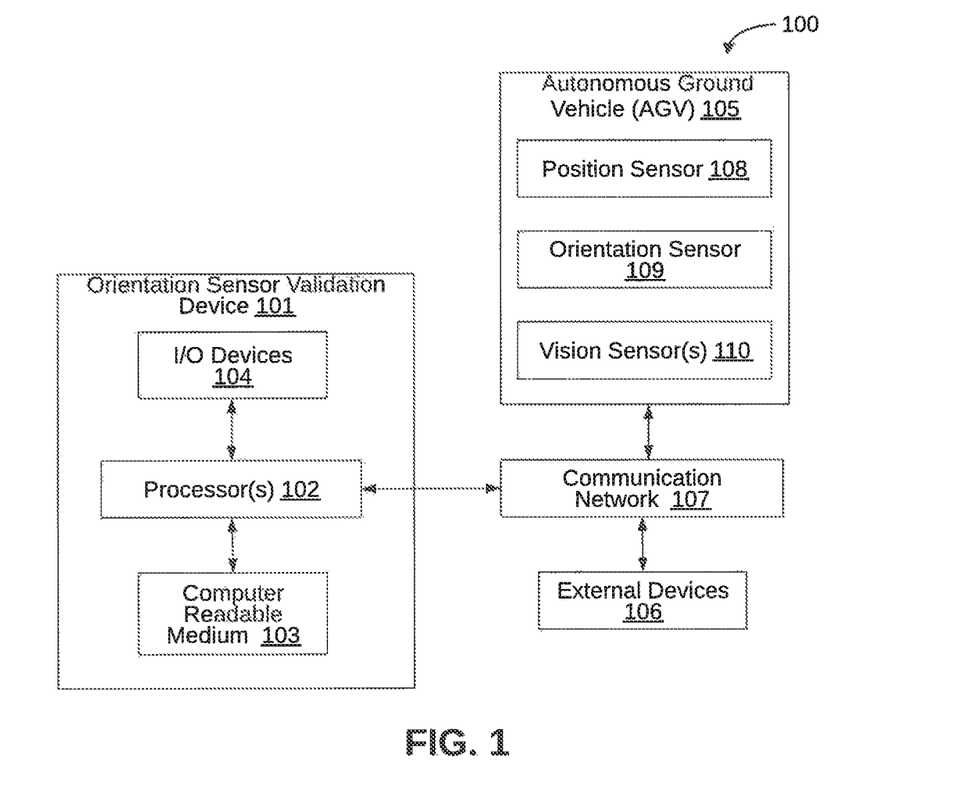
FIG. 1 is a block diagram of an exemplary system for validating readings of an orientation sensor mounted on an autonomous ground vehicle (AGV), in accordance with some embodiments of the present disclosure.

Referring now to FIG. 1, an exemplary system 100 for validating readings of an orientation sensor 109 mounted on an autonomous ground vehicle (AGV) 105, is illustrated, in accordance with some embodiments of the present disclosure. In particular, the system 100 may implement an orientation sensor validation device 101 so as to validate readings of the orientation sensor 109 in the AGV 105. As will be appreciated, the orientation sensor validation device 101 may be any computing device (for example, server, desktop, laptop, notebook, netbook, tablet, smartphone, mobile phone, or the like).

Further, as will be appreciated by those skilled in the art, the AGV 105 may be any vehicle capable of sensing the dynamic changing environment, and of navigating without any human intervention. Thus, the AGV 105 may include at least a number of sensors, a vehicle drivetrain, and a processor based control system, among other components. The sensors may enable sensing the dynamic changing environment by capturing various sensor parameters. The sensors may include a position sensor 108 for acquiring instant position (i.e., current location) of the AGV 105 with respect to a navigation map (i.e., within a global reference frame), the orientation sensor 109 for acquiring instant orientation (i.e., current pose or direction) of the AGV 105 with respect to the navigation map, and one or more vision sensors 110 for acquiring instant three-dimensional (3D) image of an environment around the AGV 105. In some embodiments, the 3D image may be a 360 degree field of view (FOV) of the environment (i.e., environmental FOV) that may provide information on presence of any objects in the vicinity of the AGV 105. Further, in some embodiments, the 3D image may be a frontal FOV of a navigation path (i.e., navigational FOV) of the AGV 105. By way of example, the position sensor 108 may be a global positioning system (GPS) sensor, the orientation sensor 109 may be an inertial measurement unit (IMU) sensor, and the vision sensors 110 may be any of a light detection and ranging (LiDAR) scanner, a laser scanner, a radio detection and ranging (RADAR) scanner, a short-range RADAR scanner, a camera, or ultrasonic scanner.

As will be described in greater detail in conjunction with FIGS. 2-8, the orientation sensor validation device 101 may receive a distance and an angle of observation of each of at least two fixed objects with respect to the AGV 105 at a first position and then at a second position, calculate a first orientation and a second orientation of the AGV 105 at the first position and at the second position respectively based on the distance and the angle of observation of each of the at least two fixed objects with respect to the AGV 105 at the first position and at the second position and coordinate positions of each of the at least two fixed objects on a navigation map, determine an actual change in orientation of the AGV 105 from the first position to the second position based on the first orientation and the second orientation, and validate readings of the orientation sensor 109 based on the actual change in orientation. It should be noted that the at least two fixed objects may be objects with pre-identified properties in a field of view of the vision sensor 110 and on both sides of the AGV 105. Further, it should be noted that the distance and the angle of observation may be determined based on data from the vision sensor. In some embodiments, the first position and the second position may be on a navigation path of the AGV 105 and may be determined from the position sensor 108. In such embodiments, the at least two fixed objects may be landmarks with pre-identified properties on both sides of the navigation path.

The orientation sensor validation device 101 may include one or more processors 102, a computer-readable medium (for example, a memory) 103, and an input/output (I/O) device 104. The computer-readable medium 103 may store instructions that, when executed by the one or more processors 102, cause the one or more processors 102 to validate readings of the orientation sensor 109, in accordance with aspects of the present disclosure. The computer-readable medium 103 may also store various data (for example, pre-identified properties of multiple fixed objects at multiple positions on a navigation path, vision sensor data at each position, distance and angle of observation of each fixed object at each position, coordinate positions of each fixed object at each position, calculated orientation of AGV at each position, reading of the orientation sensor at each position, variation ranges of the orientation sensor along with corresponding average performance deviations, or the like) that may be captured, processed, and/or required by the orientation sensor validation device 101. The orientation sensor validation device 101 may interact with a user via a user interface accessible via the I/O devices 104. The orientation sensor validation device 101 may also interact with one or more external devices 106 or with the AGV 105 over a communication network 107 for sending or receiving various data. The external devices 106 ray include, but may not be limited to, a remote server, a digital device, or another computing system.

Figure 2:
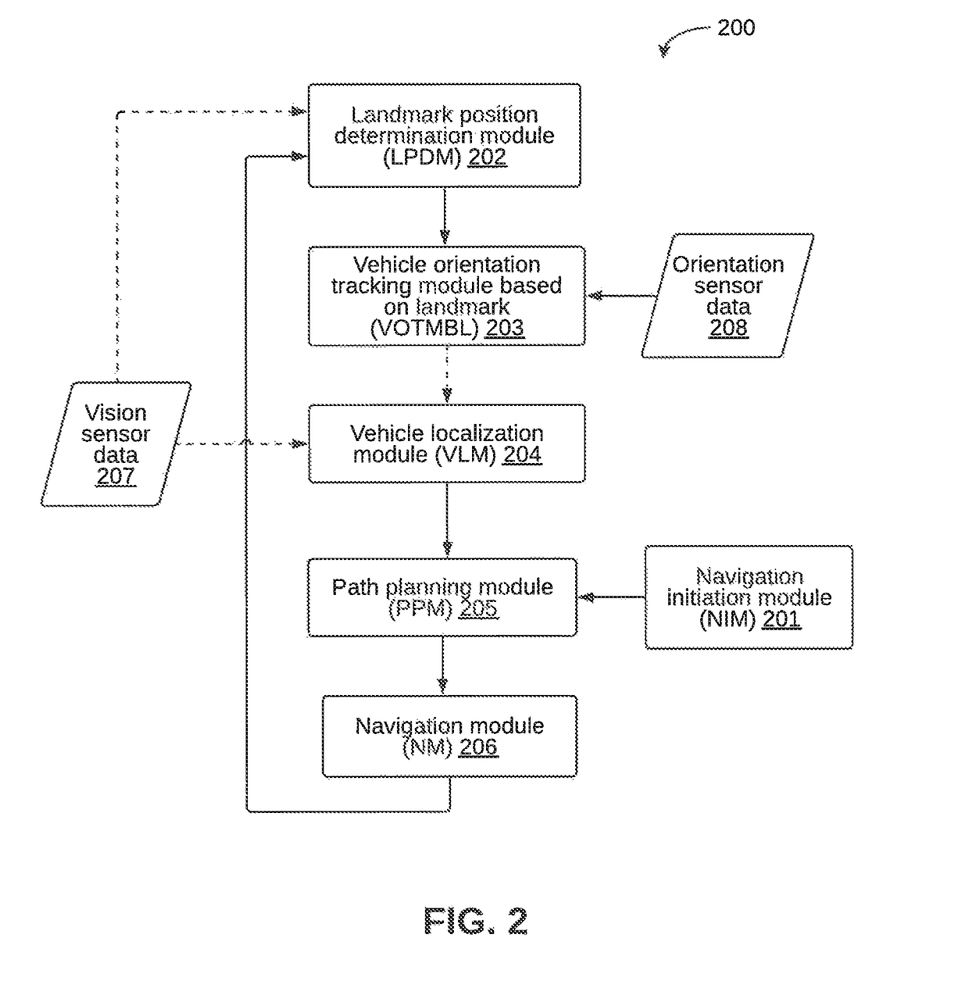
FIG. 2 is a functional block diagram of the exemplary system of FIG. 1, in accordance with some embodiments of the present disclosure.

Referring now to FIG. 2, a functional block diagram of an exemplary system 200, analogous to the exemplary system 100 of FIG. 1, is illustrated, in accordance with some embodiments of the present disclosure. The system 200 may include various modules that perform various functions so as to determine an orientation of the AGV, to validate reading of the orientation sensor mounted on the AGV, and to perform navigation of the AGV. In some embodiments, system 200 may include a landmark position determination module (LPDM) 202, and a vehicle orientation tracking module based on landmark (VOTMBL) 203. In some embodiments, the system 200 may further include a navigation initiation module (NIM) 201, a vehicle localization module (VLM) 204, a path planning module (PPM) 205, and a navigation module (NM) 206. It should be noted that, in some embodiments, the LPDM 202 and the VOTMBL 203 may be a part of the orientation sensor validation device in the system 200, while the NIM 201, VLM 204, PPM 205, and NM 206 may be a part of navigation device in the AGV in the system 200. As will be appreciated, the system 200 may also include various other modules than those mentioned above so as to control and navigate the AGV. Further, as will be appreciated by those skilled in the art, all such aforementioned modules 201-206 may be represented as a single module or a combination of different modules. Moreover, as will be appreciated by those skilled in the art, each of the modules 201-206 may reside, in whole or in parts, on one device or multiple devices in communication with each other.

The NIM 201 may provide a user interface (UI) for the system 200. The UI may display a navigation map along with a current location of the AGV to a user. The user may provide inputs to the system 200 via the UI. For example, the user may provide a destination location by touching any point (on a drivable road area) on the navigation map. This may initiate the navigation process from path planning, to velocity generation, to autonomous navigation from the source (i.e., current location) to the destination (i.e., destination).

The LPDM 202 may identify a number of fixed objects (e.g., landmarks) within a field of view (FOV) of the AGV. In particular, the LPDM 202 may identify nearby landmarks on both sides of the navigation path within the navigational FOV of the AGV. In some embodiments, the LPDM 202 may identify a fixed object based on vision sensor data 207. For example, the LPDM 202 may identify the fixed object by clustering LiDAR point cloud data, by processing camera images, or by employing an artificial intelligence (AI) model on the vision sensor data 207. It should be noted that, in some embodiments, the LPDM 202 may identify nearby fixed objects that match with pre-identified properties of such objects. For example, in some embodiments, the LPDM 200 may identify the nearby fixed objects when properties of observed fixed objects match with pre-identified properties of pre-identified objects in the vicinity of the AGV. As will be appreciated, the vicinity of the AVG may be determined based on the position of the AGV in the navigation map. It should be noted that each of the identified fixed objects with pre-identified properties may have known coordinate positions on the navigation map.

The VOTMBL 203 may receive position data with respect to identified fixed objects from the LPDM 202 and orientation sensor data 208 from the orientation sensor. The VOTMBL 203 may determine exact position (i.e., distance and angle of observation) of each of the fixed objects with respect to the AGV whenever they are observed (i.e., identified by the LPDM 202). In particular, the VOTMBL 203 may determine the exact positions of the fixed objects on both sides of the navigation path at each observation made by the LPDM 202. The VOTMBL 203 may then calculate, at each observation, the exact orientation of the AGV based on the exact positions of the fixed objects and corresponding known coordinate positions of the fixed objects. Further, the VOTMBL 203 may determine a difference between two consecutive measures of exact orientations of the AGV (i.e., from two consecutive positions), and a difference in absolute readings of the orientation sensor recorded at the same two instances (i.e., at same two consecutive positions). The VOTMBL 203 may then validate the readings of the orientation sensor by comparing the difference between two consecutive measures of exact orientations of the AGV with the difference in absolute readings of the orientation sensor. In some embodiments, error or performance deviation (i.e., the difference between the differences) may be recorded for each variation range of the orientation sensor. It should be noted that such performance deviation may be recorded for not more than a predetermined number of times during a monitoring cycle. This ensures an even distribution of monitoring coverage for each variation range.

The VLM 204 may receive the vehicle orientation data while tracking the landmark position from the VOTMBL 203. Further, while the AGV is in motion, the VLM 204 may collect wheelbase feedback data, navigation map data, and current environment observation data (e.g., LIDAR point cloud data). Based on the received or collected data, the VLM 204 may continuously localize the position of the AGV on the navigation map with respect to the environment. Thus, the VLM 204 may be responsible for indicating an instant location of the AGV on the navigation map while performing navigation. Any further global path planning or trajectory planning may start from this instant location.

The PPM 205 may receive instant location of the AGV on the navigation map from the VLM 204. Further, the PPM 205 may receive a source and destination location from the NIM 201 so as to plan path and start navigation. The PPM 205 may then produce the base path for AGV's navigation from the instant or current location to the destination location. This base path may also be referred to as navigation path or global path. It should be noted that, for instant motion, the AGV may need detailed information on a section of the global path, e.g., possibly 10-15 meters ahead of the current location on the global path. The PPM 205 may generate a suitable trajectory plan for this initial distance based on current environment data, position and orientation of the AGV, and instant speed of the AGV.

The NM 206 may receive planned path and planned trajectory from the PPM 205 and generate actual velocity of the AGV. In particular, the NM 206 may generate a realistic velocity based on previous moment velocity and the projected velocity as per the trajectory plan. The velocity generation may happen in certain frequency of, say, 100 millisecond (ms) and applied to the AGV's wheelbase. Additionally, the NM 206 may observe a next moment velocity for further computation of realistic velocity. Moreover, the NM 206 may provide feedback with respect to wheelbase data, orientation sensor data, and environmental data (i.e., the vision sensor data), etc. to the LPDM 202.

It should be noted that all such aforementioned modules 201-206 may be implemented in programmable hardware devices such as programmable gate arrays, programmable array logic, programmable logic devices, or the like. Alternatively, all such aforementioned modules 201-206 may be implemented in software for execution by various types of processors. An identified module of executable code may, for instance, include one or more physical or logical blocks of computer instructions which may, for instance, be organized as an object, procedure, function, or other construct. Nevertheless, the executables of an identified module need not be physically located together, but may include disparate instructions stored in different locations which, when joined logically together, comprise the module and achieve the stated purpose of the module. Indeed, a module of executable code may be a single instruction, or many instructions, and may even be distributed over several different code segments, among different applications, and across several memory devices.

As will be appreciated by one skilled in the art, a variety of processes may be employed for validating readings of an orientation sensor mounted on an AGV. For example, the exemplary system 100 and the associated orientation sensor validation device 101 may validate readings of the orientation sensor 109 mounted on the AGV 105 by the processes discussed herein. In particular, as will be appreciated by those of ordinary skill in the art, control logic and/or automated routines for performing the techniques and steps described herein may be implemented by the system 100 and the associated orientation sensor validation device 101, either by hardware, software, or combinations of hardware and software. For example, suitable code may be accessed and executed by the one or more processors on the system 100 or the associated orientation sensor validation device 101 to perform some or all of the techniques described herein. Similarly, application specific integrated circuits (ASICs) configured to perform some or all of the processes described herein may be included in the one or more processors on the system 100 or on the associated orientation sensor validation 101.

Figure 3:
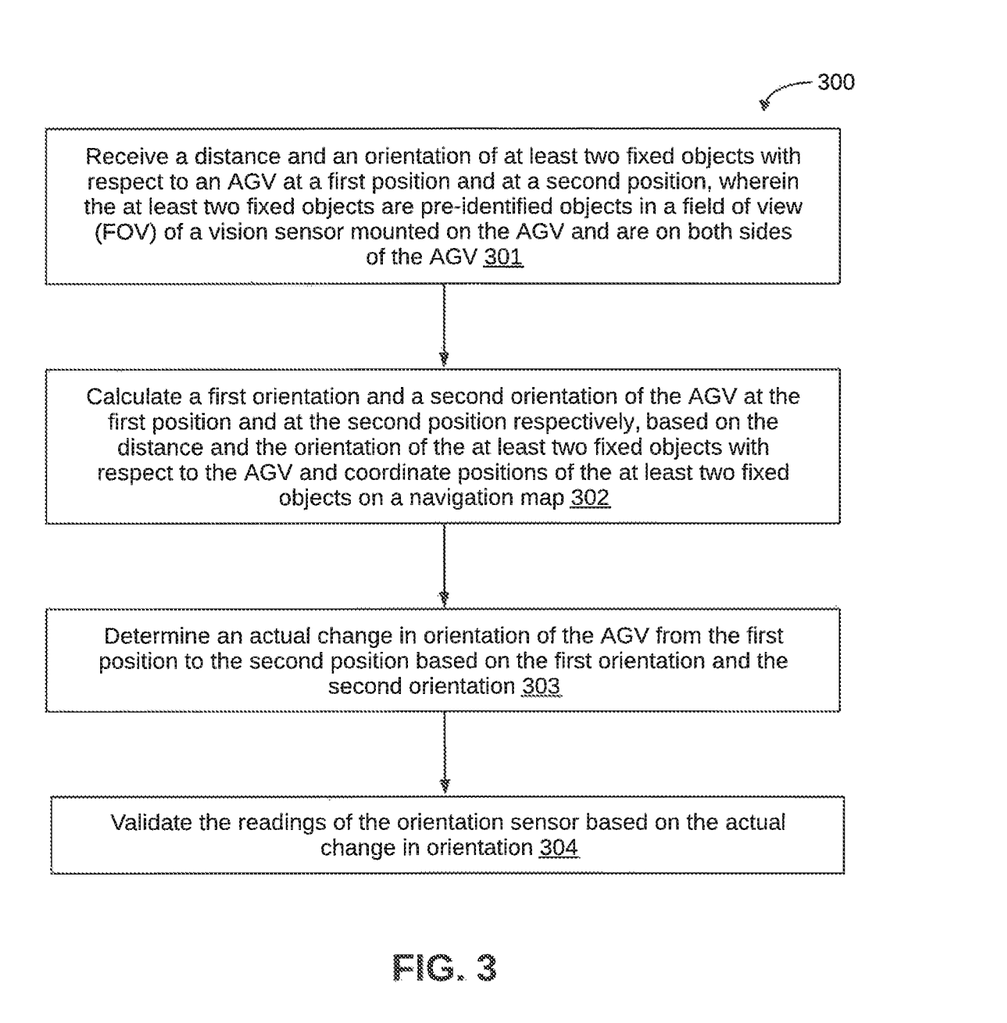
FIG. 3 is a flow diagram of an exemplary process for validating readings of an orientation sensor mounted on an AGV, in accordance with some embodiments of the present disclosure.

For example, referring now to FIG. 3, exemplary control logic 300 for validating readings of the orientation sensor mounted on the AGV via a system, such as the system 100 or the associated orientation sensor validation device 101, is depicted via a flowchart, in accordance with some embodiments of the present disclosure. As illustrated in the flowchart, the control logic 300 may include the step of receiving a distance and an angle of observation of each of at least two fixed objects with respect to the AGV at a first position and then at a second position at step 301. It should be noted that the at least two fixed objects may be objects with pre-identified properties in a field of view of a vision sensor mounted on the AGV and on both sides of the AGV. Additionally, it should be noted that the distance and the angle of observation may be determined based on data from the vision sensor. Further, the control logic 300 may include the step of calculating a first orientation and a second orientation of the AGV at the first position and at the second position respectively, based on the distance and the angle of observation of each of the at least two fixed objects with respect to the AGV at the first position and at the second position and coordinate positions of each of the at least two fixed objects on a navigation map at step 302. Moreover, the control logic 300 may include the steps of determining an actual change in orientation of the AGV from the first position to the second position based on the first orientation and the second orientation at step 303, and validating the readings of the orientation sensor based on the actual change in orientation at step 304.

In some embodiments, the AGV may be navigating along a navigation path. Additionally, in some embodiments, the first position and the second position may be on the navigation path. Further, in some embodiments, the at least two fixed objects may be landmarks with pre-identified properties on both sides of the navigation path. Moreover, in some embodiments, the vision sensor may include at least one of a light detection and ranging (LiDAR) scanner, a radio detection and ranging (RADAR) scanner, a short range radar scanner, a camera, or an ultrasonic scanner.

In some embodiments, receiving the distance and the angle of observation of each of the at least two fixed objects at step 301 may include the steps of receiving an indication of each of the at least two fixed objects based on a reference distance and a reference angle of observation from the navigational map, and identifying presence of each of the at least two fixed objects upon receiving the indication by comparing the distance and the angle of observation with the reference distance and the reference angle of observation respectively. It should be noted that, in some embodiments, the indication of a fixed may be the reference distance and the reference angle of observation of the fixed object. Additionally, in some embodiments, receiving the distance and the angle of observation of a fixed object at step 301 may include the step of computing the distance and the angle of observation of the fixed object based on the data from the vision sensor. Further, in some embodiments, validating at step 304 may include the steps of determining a change in orientation of the AGV from the first position to the second position based on a first reading of the orientation sensor at the first position and a second reading of the orientation sensor at the second position, and comparing the change in orientation with the actual change in orientation.

In some embodiments, the control logic 300 may further include the step of identifying an inaccuracy in the readings of the orientation sensor based on the validation. Additionally, in such embodiments, the control logic 300 may further include the steps of notifying a user with respect to the identified inaccuracy, or initiating a corrective action based on the identified inaccuracy. Further, in some embodiments, the control logic 300 may further include the step of performing validation for each of a plurality of variation ranges of the orientation sensor for a pre-determined number of times during a periodic monitoring cycle.

Figure 4:
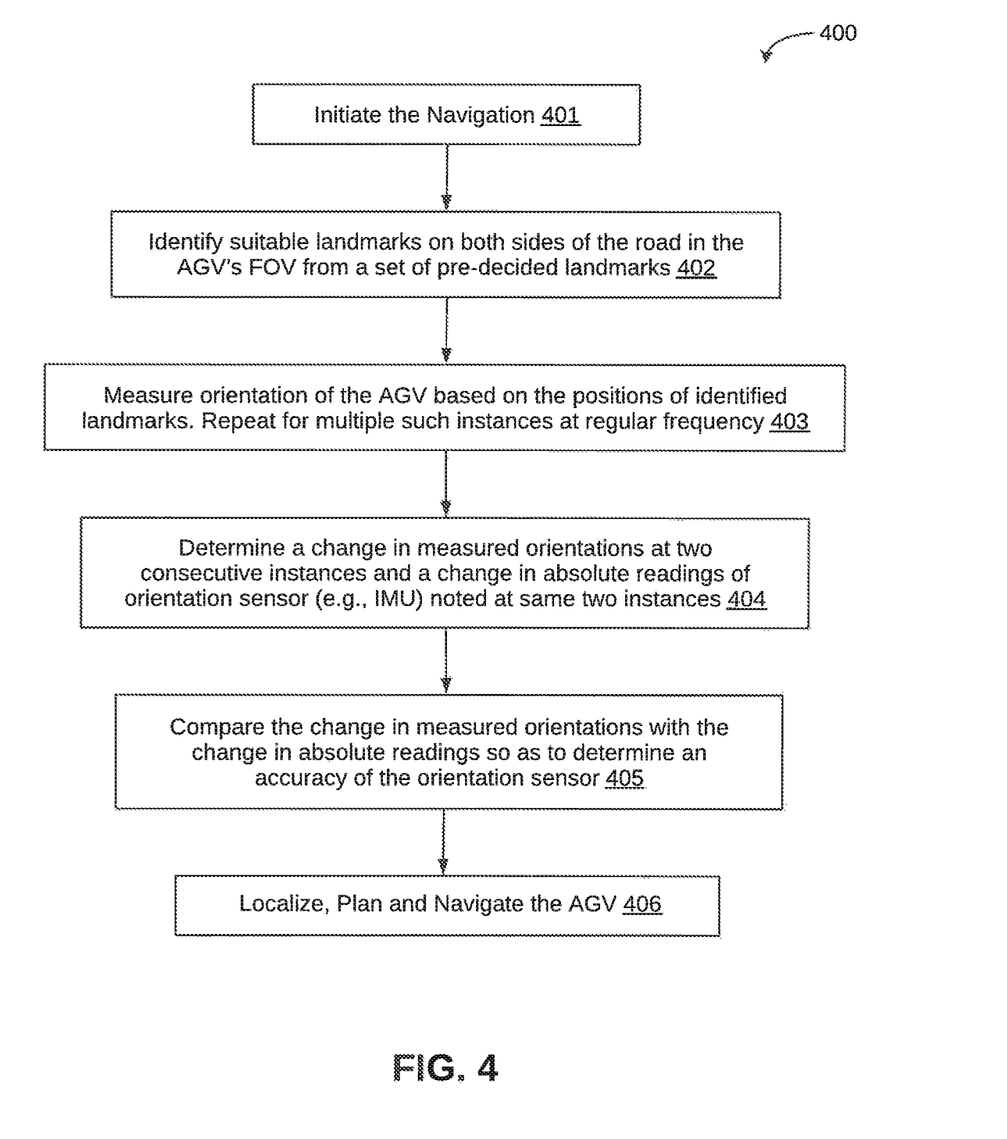
FIG. 4 is a flow diagram of a detailed exemplary process for validating readings of an orientation sensor mounted on an AGV, in accordance with some embodiments of the present disclosure.

Referring now to FIG. 4, an exemplary process 400 for validating readings of the orientation sensor (e.g., IMU) mounted on the AGV is depicted in greater detail via a flowchart, in accordance with some embodiments of the present disclosure. At step 401, the NIM 201 may initiate the navigation of the AGV. At step 402, the LPDM 202 may identify suitable landmarks on both sides of the road in the AGV's FOV based on a set of pre-decided (i.e., pre-identified) properties for such landmarks. At step 403, the VOTMBL 203 may measure the orientation of the AGV based on positions of the identified landmarks. The VOTMBL 203 in conjunction with the LPDM 202 may measure orientations of the AGV for multiple such instances (e.g., at multiple positions of the AGV) at regular frequency. Further, at step 404, the VOTMBL 203 may determine a change in measured orientations at two consecutive instances and a change in absolute readings of orientation sensor (i.e., IMU) noted at same two instances. At step 405, the VOTMBL 203 may compare the change in measured orientations with the change in absolute readings so as to determine an accuracy of the orientation sensor. Moreover, at step 406, the VLM 204 may localize the vehicle, the PPM 205 may plan the path and trajectory of the AGV, and the NM 206 may navigate the AGV based on the planned path and trajectory. Each of these steps 401-406 will be described in greater detail below.

At step 401, the NIM 201 may receive input with respect to a desired destination from the user via the UI. The NIM 201 may display the navigation map along with the current location of the AGV to the user. The user may provide the destination location by touching any point (on the drivable road area) on the navigation map. Upon receiving the input, the NIM 201 may initiate the navigation from path planning to velocity generation.

At step 402, the LPDM 202 may receive navigational FOV data from the vision sensors mounted on the AGV. The LPDM 202 may also have information (e.g., pre-identified properties) with respect to identification of a set of landmarks. The LPDM 202 may then identify nearby landmarks on both sides of the road in the navigational FOV of the AGV as the AGV moves on. The LPDM 202 may identify landmarks from the navigational FOV data by processing the vision sensor data. For example, the LPDM 202 may identify landmarks by clustering LiDAR point cloud data, by processing camera images, or by employing an artificial intelligence (AI) model on the vision sensor data.

It should be noted that the LPDM 202 may identify nearby landmarks by matching information (e.g., properties) with respect to observed landmarks (i.e., landmarks observed by the vision sensor) with pre-recorded information (e.g., pre-identified properties) with respect to pre-identified landmarks (e.g., pre-identified landmarks from the navigation map that are in the vicinity of the AGV). The information with respect to each of the set of pre-identified landmarks may be specifically stored as annotated information on the navigation map. As stated above, the navigation map may also be used by the AGV for localization, path planning, and navigation. Whenever the real-world landmarks appear within the navigational FOV of the AGV, their position information (i.e., coordinate positions) with respect to the navigation map may be extracted for correlation and subsequent processing. In other words, the identification of landmarks by the LPDM 202 is performed at the hint of location of such landmarks as per the navigation map.

As will be appreciated, at least one landmark may be required to be identified at each side of the road for calculation of the orientation of the AGV. The landmarks may be identifiable objects that are frequently present (i.e., available at required density and at regular intervals) on both sides of the road. Further, the landmarks may be either naturally existing or human placed. For example, the landmarks may include, but may not be limited to, lamp post, traffic signal post, or marked trees that are present at every 20-30 meters at both the sides of the road. It should be noted that, in some embodiments, multiple landmarks may appear in close proximity on any side of the road. In such embodiments, the LPDM 202 may select prominent properties (e.g., height, width, classification information, or the like.) of any one landmark from annotated map data, and extract position of the corresponding real-world landmark from the navigational FOV of the AGV. Further, it should be noted that the selection of prominent properties may be such that a few specific type of common landmark (e.g., lamp post, traffic signal post, etc.) may win the selection by the LPDM 202, which may then successfully identify that landmark in the navigational FOV.

Figure 5:
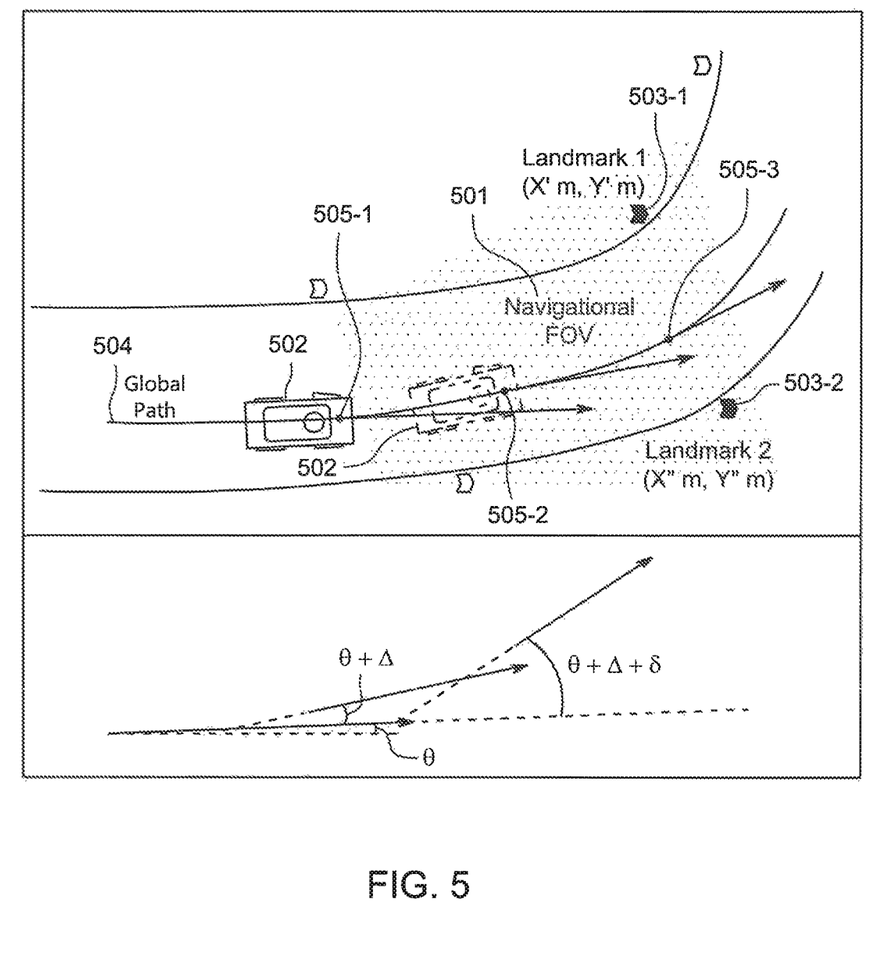
FIG. 5 illustrates an exemplary navigational field of view (FOV) of an AGV at a given position on a navigation path of the AGV such that FOV includes at least two fixed objects on both sides of the AGV, in accordance with some embodiments of the present disclosure.

Further, in some embodiments, there may be pre-defined criteria or guideline for selection of landmarks from the navigational FOV data. For example, the landmarks may be selected while vehicle is taking turn at one or more turns on the navigation path. Referring now to FIG. 5, an exemplary navigational FOV 501 of an AGV 502 at a given position 505-1 on a navigation path 504 of the AGV 502 is illustrated. The FOV 501 may include at least two fixed objects (e.g., at least two landmarks) 503-1 and 503-2 on both sides of the AGV 502, in accordance with some embodiments of the present disclosure. By way of example, in the illustrated embodiment, the two landmarks (i.e., Landmark 1 and Landmark 2) may be selected such that, till the time they may be visible from the AGV 502, the AGV 502 may be changing its orientation from a certain value 'Θ' at position 505-1 to 'Θ+Δ' at position 505-2 or from a value 'Θ+Δ' at position 505-2 to 'Θ+Δ+δ' at position 505-3. For this purpose, a portion of navigation path 504 within the navigational FOV 501 may be referred. Alignment or orientation of the navigation path 504 may be determined. It should be noted that, as the AGV 502 will adhere to the navigation path 504, the AGV 503 will also supposedly take this orientation. Thus, it should be noted that, at various turning region, different range of variation in the reading of the orientation sensor may be observed. It is, therefore, an objective of the LPDM 202 to select those pre-defined landmarks from a navigation segment that may cover a certain range of variation in the reading of the orientation sensor.

Figure 6:
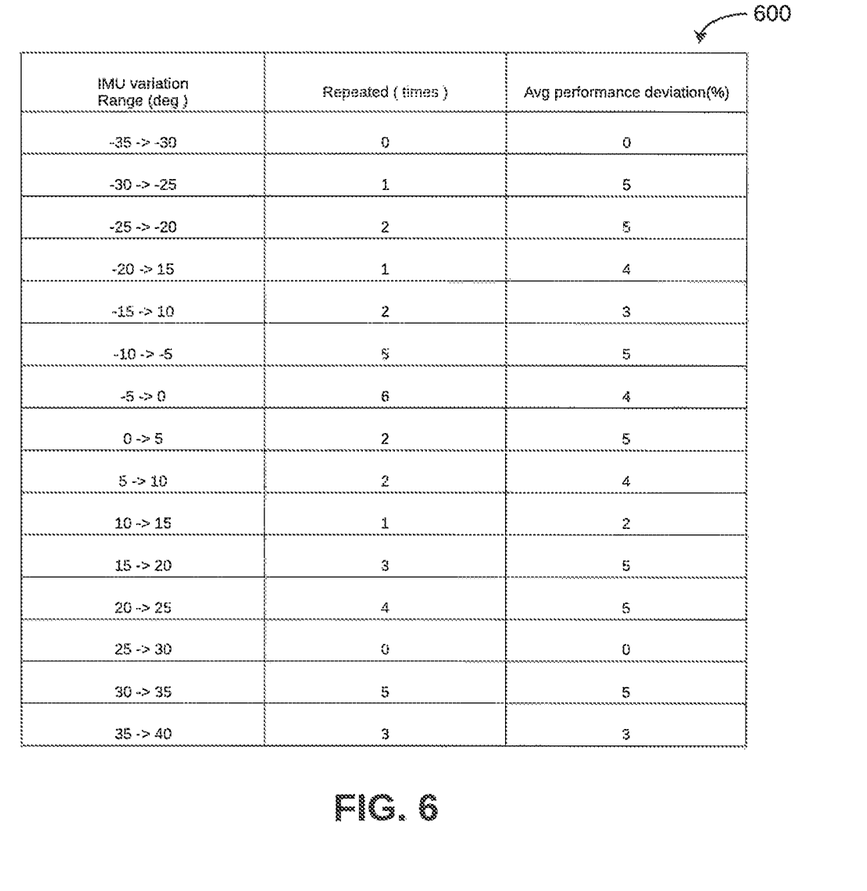
FIG. 6 illustrates an exemplary table with various variation ranges of the orientation sensor readings and corresponding average performance deviations, in accordance with some embodiments of the present disclosure.

If a certain variation range comes again and again (i.e., at more frequent interval than other ranges), the LPDM 202 may skip that range in a journey. In some embodiments, the LPDM 202 may maintain a database for a frequency of occurrences of different variation ranges. Thus, the LPDM 202 may distribute selection of landmark in such a way that selection cover all the range verification. Referring now to FIG. 6, an exemplary table 600 with various variation ranges of the orientation sensor readings and corresponding average performance deviations is illustrated, in accordance with some embodiments of the present disclosure. In such embodiments, the LPDM 202 may work on the basis of such table 600. In the table 600, the field 'Repeated' should have enough number observations for all the variation ranges of the orientation sensor.

Referring back to FIG. 4, at step 403, the VOTMBL 203 may measure the orientation of the AGV based on the positions of the identified landmarks on both sides of the road. As will be appreciated, upon identification of the landmark, the VOTMBL may determine the angle of observation and distance of both of the landmarks. In particular, as the AGV drives along the navigation path, the VOTMBL 203 in conjunction with the LPDM 202 may frequently observe and determine landmark position on both side of road when declared by the system (as pre-identified) and when additionally identified in the navigation map. At each instance or position of the AGV, the VOTMBL 203 may calculate the orientation of the AGV based on the landmark position data (i.e., distance and angle of observation of the two landmarks with respect to the AGV as derived from the vision sensor data and the given coordinate positions of the two landmark as extracted from the navigation map). The determination of the orientation of the AGV based on the landmark position data at any given instance is explained in greater detail herein below.

Figure 7:
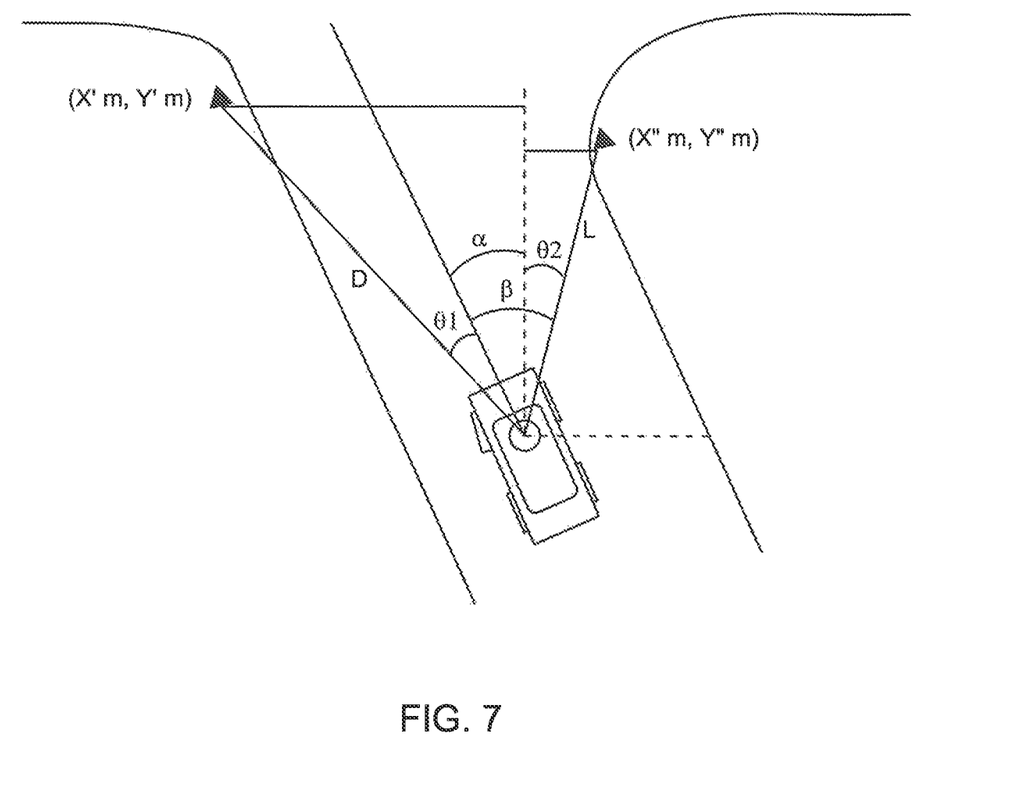
FIG. 7 illustrates an exemplary derivation of an orientation of the AGV at the given position based on the at least two fixed objects of FIG. 5, in accordance with some embodiments of the present disclosure.

Referring now to FIG. 7, an exemplary derivation of an orientation of the AGV at the given position based on the at least two fixed objects of FIG. 5 is illustrated, in accordance with some embodiments of the present disclosure. It should be noted that the coordinate positions of each of the two landmarks may be acquired from the navigation map. By way of example, coordinate positions for landmark 1 may be $(x'_m, y'_m)$, while that for second landmark 2 may be $(x''_m,$ $y''_m$). Further, the exact distance and exact angle of observation each of the two landmarks with respect to the AGV at any instance may be acquired from the navigational FOV data (i.e., vision sensor data). By way of example, the exact distance and exact angle of observation of the landmark 1 with respect to the AGV at a given instance may be D and $\Theta_1$, while that of landmark 2 may be L and β (β=$\Theta_2$+α). It should be noted that α may be orientation of the AGV at that instance and may be calculates as follows:

$$|D*\cos(\Theta_1+\alpha)|-|L*\cos(\beta-\alpha)|=|y'_m|-|y''_m| \quad \text{Equation 1}$$

$$|D*\sin(\Theta_1+\alpha)|+|L*\sin(\beta-\alpha)|=|x'_m|+|x''_m| \quad \text{Equation 2}$$

Now, equation (1) may be expressed as follows:

$$D*\cos(\Theta_1)*\cos(\alpha)+D*\sin(\Theta_1)*\sin(\alpha)-L*\cos(\beta)*\cos(\alpha)+L*\sin(\beta)*\sin(\alpha)=|y'_m|-|y''_m|, \text{ or}$$

$$p*\cos(\alpha)+q*\sin(\alpha)=a_1 \quad \text{Equation 3}$$

Similarly, equation (2) may be expressed as follows:

$$r*\cos(\alpha)+t*\sin(\alpha)=a_2 \quad \text{Equation 4}$$

Upon resolving equation (3) and equation (4), the value of α may be calculated from either of the following:

$$\cos(\alpha)=b_1, \text{ or}$$

$$\sin(\alpha)=b_2.$$

Upon proceeding some further distance (i.e., another instance), the AGV may have a new orientation (say, α') with respect to the navigation map. Again, this new orientation (i.e., α') may be calculated as described above. Thus, the VOTMBL 203 may calculate the orientations of the vehicle for multiple such instances at regular frequency. Further, at each instance of determination of orientation, the reading (say, $\alpha_1$ or $\alpha_1$') of the orientation sensor (e.g., IMU) may be noted.

Referring back to FIG. 4, at step 404, the VOTMBL 203 may determine a change in measured orientations (say, Δ=α-α') of the AGV at two consecutive instances. The VOTMBL 203 may also determine a change in absolute readings (say, $\Delta_1=\alpha_1-\alpha_1$') of the orientation sensor (e.g., IMU) noted at the same two instances.

At step 405, the VOTMBL 203 may compare the change in measured orientations (i.e., Δ) of the AGV with the change in absolute readings (i.e., $\Delta_1$) so as to determine accuracy of the orientation sensor. In other words, the difference between two consecutive measurements of the orientation (i.e., Δ) may compared with difference between two corresponding (i.e., recorded at the same two consecutive instances) absolute readings (i.e., $\Delta_1$) of the orientation sensor so as to determine performance deviation of the orientation sensor. In some embodiments, the difference between the differences (i.e., differences between Δ and $\Delta_1$) may be the deviation in the performance of the orientation sensor. Further, as stated above, the performance deviation may be calculated for different variation ranges of the orientation sensor. Moreover, for each of the variation ranges, a pre-determined number of performance deviations may be computed to determine an average performance deviation for that variation range. If a certain variation range comes again and again (i.e., more than the pre-determined number required for computing average), the LPDM 202 and/or the VOTMBL 203 may skip the process for that range for the rest of the journey or for the rest of the monitoring cycle (say, next 3 months).

At step 406, the VLM 204, PPM 205, and NM 206 may perform the navigation of the AGV. Upon receiving the source location from the VLM 204 and the initiation trigger along with destination location from the NIM 201, the PPM 205 may plan a suitable global path for the AGV. Additionally, the PPM 205 may plan a local trajectory of the AGV for a localized segment of global path (say, 10-15 meters ahead of the current location on the global path) based on based on current environment data, position and orientation of the AGV, and instant speed of the AGV. Once the PPM 205 finalizes the trajectory velocity plan, it may provide the same to NM 206 for actual velocity generation. This NM 206 may generate a realistic velocity based on previous moment velocity and the projected velocity as per the trajectory plan. This velocity generation may happens in certain frequency of say 100 millisecond (ms). Further, the generated velocity may be applied to the AGV's wheelbase. Moreover, a next moment velocity may be observed for further ealistic velocity generation.

While the vehicle is in motion, the VLM 204 may collect data from wheelbase feedback, environmental data (e.g., position data from position sensor, orientation data from orientation sensor corrected for performance deviation in an instant variation range, etc.), and the current environment or navigational FOV fata (e.g., LiDAR point cloud data). The VLM 204 may continuously localize the vehicle position on the navigation map based on the collected data. As will be appreciated, such localization may be for indicating the vehicle on the navigation map while navigating, for further global path planning, or for further trajectory planning.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 8:
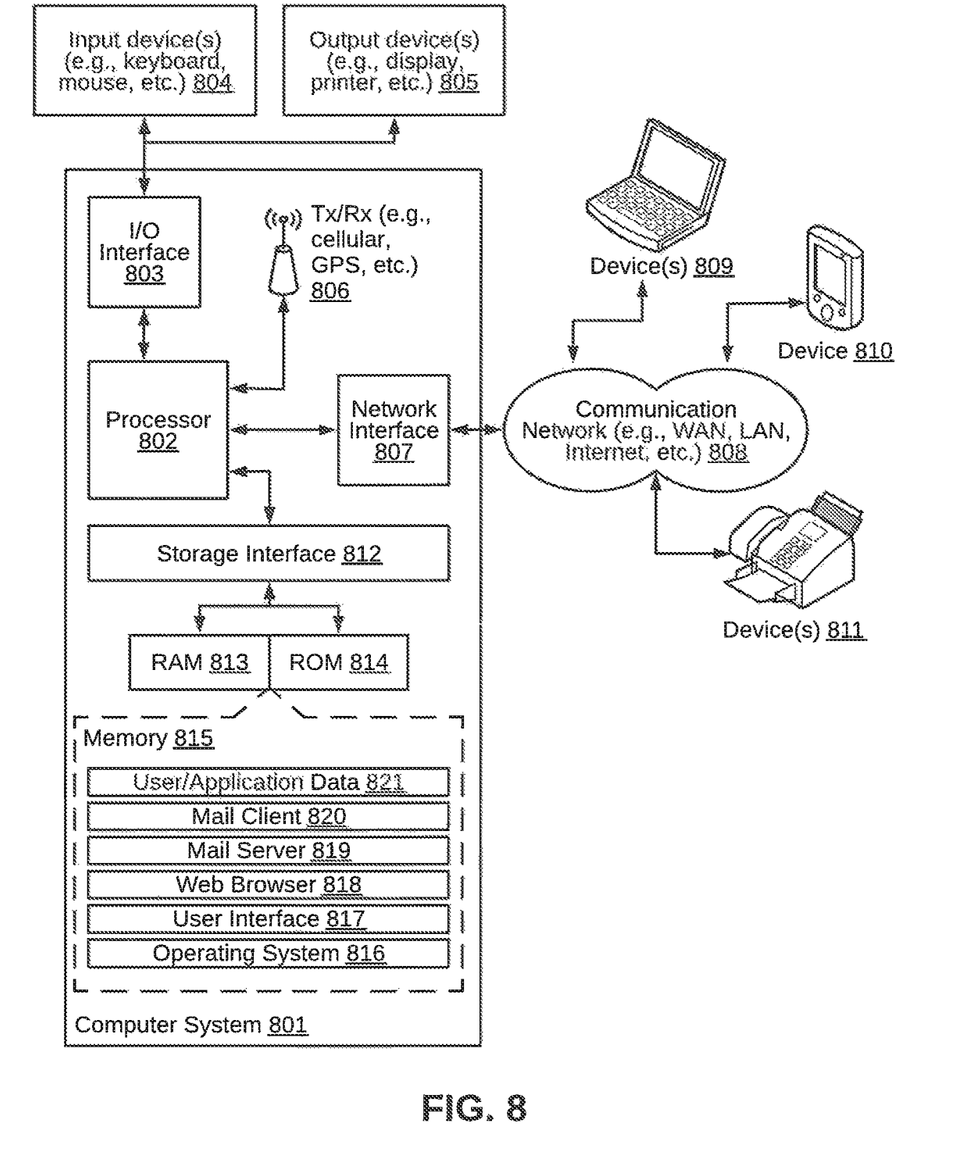
FIG. 8 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 8, a block diagram of an exemplary computer system 801 for implementing embodiments consistent with the present disclosure is illustrated. Variations of computer system 801 may be used for implementing orientation sensor validation device 101 or the navigation device in the system 100. Computer system 801 may include a central processing unit ("CPU" or "processor") 802. Processor 802 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 802 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 802 may be disposed in communication with one or more input/output (I/O) devices via I/O interface 803. The I/O interface 803 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 803, the computer system 801 may communicate with one or more I/O devices. For example, the input device 804 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 805 may be a printer, fax machine, video display (e.g., cathode ray tube (CRT), liquid crystal display (LCD), light-emitting diode (LED), plasma, or the like), audio speaker, etc. In some embodiments, a transceiver 806 may be disposed in connection with the processor 802. The transceiver may facilitate various types of wireless transmission or reception. For example, the transceiver may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 618-PMB9800® transceiver, or the like), providing IEEE 802.11a/b/g/n, Bluetooth, FM, global positioning system (GPS), 2G/3G HSDPNHSUPA communications, etc.

In some embodiments, the processor 802 may be disposed in communication with a communication network 808 via a network interface 807. The network interface 807 may communicate with the communication network 808. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 808 may include, without limitation, a direct interconnection, local area network (LAN), wide area network (WAN), wireless network (e.g., using Wireless Application Protocol), the Internet, etc. Using the network interface 807 and the communication network 808, the computer system 801 may communicate with devices 809, 810, and 811. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 801 may itself embody one or more of these devices.

In some embodiments, the processor 802 may be disposed in communication with one or more memory devices (e.g., RAM 813, ROM 814, etc.) via a storage interface 812. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 816, user interface application 817, web browser 818, mail server 819, mail client 820, user/application data 821 (e.g., any data variables or data records discussed in this disclosure), etc. The operating system 816 may facilitate resource management and operation of the computer system 801. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACKBERRY® OS, or the like. User interface 817 may facilitate display, execution, interaction, manipulation, or operation of program components through textual or graphical facilities. For example, user interfaces may provide computer interaction interface elements on a display system operatively connected to the computer system 801, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 801 may implement a web browser 818 stored program component. The web browser may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 801 may implement a mail server 819 stored program component. The mail server may be an Internet mail server such as MICROSOFT® EXCHANGE®, or the like. The mail server may utilize facilities such as ASP, ActiveX, ANSI C++/C#, MICROSOFT .NET® CGI scripts, JAVA®, JAVASCRIPT®, PERL®, PHP®, PYTHON®, WebObjects, etc. The mail server may utilize communication protocols such as Internet message access protocol (IMAP), messaging application programming interface (MAPI), MICROSOFT® EXCHANGE®, post office protocol (POP), simple mail transfer protocol (SMTP), or the like. In some embodiments, the computer system 801 may implement a mail client 820 stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, computer system 801 may store user/application data 821, such as the data, variables, records, etc. (e.g., pre-identified properties of multiple fixed objects at multiple positions on a navigation path, vision sensor data at each position, distance and angle of observation of each fixed object at each position, coordinate positions of each fixed object at each position, calculated orientation of AGV at each position, reading of the orientation sensor at each position, variation ranges of the orientation sensor along with corresponding average performance deviations, and so forth) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above are not routine, or conventional, or well understood in the art. The techniques discussed above provide for cross-verification of operation of one sensor by another while performing its primary job. Typically, each sensor solves a particular purpose of the AGV so as facilitate its complex navigation process. However, these sensors may develop error and impair the complex navigation process. The techniques described above may employ data from one sensor to validate the readings of other sensor. In particular, the techniques provide for verification of the accuracy of absolute readings of an orientation sensor (e.g., IMU) mounted on an AGV by using data from vision sensor (e.g., LiDAR) mounted on the AGV. It should be noted that the techniques provides for a parallel process, which may function independently and may act as a guide to the actual process. Further, as will be appreciated, the techniques may be applied to AGV employed in indoor environment (e.g., shop floors, retail shops, or the like) as well as outdoor environment (e.g., autonomous vehicles).

The specification has described method and system for validating readings of an orientation sensor mounted on an AGV. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of validating readings of an orientation sensor mounted on an autonomous ground vehicle (AGV), the method comprising:
   receiving, by an orientation sensor validation device, a distance and an angle of observation of each of at least two fixed objects with respect to the AGV at a first position and then at a second position, wherein the at least two fixed objects are objects with pre-identified properties in a field of view of a vision sensor mounted on the AGV and on both sides of the AGV, and wherein the distance and the angle of observation are determined based on data from the vision sensor;
   calculating, by the orientation sensor validation device, a first orientation and a second orientation of the AGV at the first position and at the second position respectively, based on the distance and the angle of observation of each of the at least two fixed objects with respect to the AGV at the first position and at the second position and coordinate positions of each of the at least two fixed objects on a navigation map;
   determining, by the orientation sensor validation device, an actual change in orientation of the AGV from the first position to the second position based on the first orientation and the second orientation; and
   validating, by the orientation sensor validation device, the readings of the orientation sensor based on the actual change in orientation.

2. The method of claim 1, wherein the AGV is navigating along a navigation path, wherein the first position and the second position are on the navigation path, and wherein the at least two fixed objects are landmarks with pre-identified properties on both sides of the navigation path.

3. The method of claim 1, wherein the vision sensor comprises at least one of a light detection and ranging (LiDAR) scanner, a radio detection and ranging (RADAR) scanner, a short range radar scanner, a camera, or an ultrasonic scanner.

4. The method of claim 1, wherein receiving the distance and the angle of observation of each of the at least two fixed objects comprises:
receiving an indication of each of the at least two fixed objects based on a reference distance and a reference angle of observation from the navigational map; and
identifying presence of each of the at least two fixed objects upon receiving the indication by comparing the distance and the angle of observation with the reference distance and the reference angle of observation respectively.

5. The method of claim 1, wherein validating comprises:
determining a change in orientation of the AGV from the first position to the second position based on a first reading of the orientation sensor at the first position and a second reading of the orientation sensor at the second position; and
comparing the change in orientation with the actual change in orientation.

6. The method of claim 1, further comprising identifying an inaccuracy in the readings of the orientation sensor based on the validation.

7. The method of claim 6, further comprising at least one of:
notifying a user with respect to the identified inaccuracy, or
initiating a corrective action based on the identified inaccuracy.

8. The method of claim 1, further comprising performing validation for each of a plurality of variation ranges of the orientation sensor for a pre-determined number of times during a periodic monitoring cycle.

9. A system for validating readings of an orientation sensor mounted on an autonomous ground vehicle (AGV), the system comprising:
an orientation sensor validation device comprising at least one processor and a computer-readable medium storing instructions that, when executed by the at least one processor, cause the at least one processor to perform operations comprising:
receiving a distance and an angle of observation of each of at least two fixed objects with respect to the AGV at a first position and then at a second position, wherein the at least two fixed objects are objects with pre-identified properties in a field of view of a vision sensor mounted on the AGV and on both sides of the AGV, and wherein the distance and the angle of observation are determined based on data from the vision sensor;
calculating a first orientation and a second orientation of the AGV at the first position and at the second position respectively, based on the distance and the angle of observation of each of the at least two fixed objects with respect to the AGV at the first position and at the second position and coordinate positions of each of the at least two fixed objects on a navigation map;
determining an actual change in orientation of the AGV from the first position to the second position based on the first orientation and the second orientation; and
validating the readings of the orientation sensor based on the actual change in orientation.

10. The system of claim 9, wherein the AGV is navigating along a navigation path, wherein the first position and the second position are on the navigation path, and wherein the at least two fixed objects are landmarks with pre-identified properties on both sides of the navigation path.

11. The system of claim 9, wherein receiving the distance and the angle of observation of each of the at least two fixed objects comprises:
receiving an indication of each of the at least two fixed objects based on a reference distance and a reference angle of observation from the navigational map; and
identifying presence of each of the at least two fixed objects upon receiving the indication by comparing the distance and the angle of observation with the reference distance and the reference angle of observation respectively.

12. The system of claim 9, wherein validating comprises:
determining a change in orientation of the AGV from the first position to the second position based on a first reading of the orientation sensor at the first position and a second reading of the orientation sensor at the second position; and
comparing the change in orientation with the actual change in orientation.

13. The system of claim 9, wherein the operations further comprise identifying an inaccuracy in the readings of the orientation sensor based on the validation.

14. The system of claim 13, wherein the operations further comprise at least one of:
notifying a user with respect to the identified inaccuracy, or
initiating a corrective action based on the identified inaccuracy.

15. The system of claim 9, wherein the operations further comprise performing validation for each of a plurality of variation ranges of the orientation sensor for a pre-determined number of times during a periodic monitoring cycle.

16. A non-transitory computer-readable medium storing computer-executable instructions for validating readings of an orientation sensor mounted on an autonomous ground vehicle (AGV), the computer-executable instructions configured for:
receiving a distance and an angle of observation of each of at least two fixed objects with respect to the AGV at a first position and then at a second position, wherein the at least two fixed objects are objects with pre-identified properties in a field of view of a vision sensor mounted on the AGV and on both sides of the AGV, and wherein the distance and the angle of observation are determined based on data from the vision sensor;
calculating a first orientation and a second orientation of the AGV at the first position and at the second position respectively, based on the distance and the angle of observation of each of the at least two fixed objects with respect to the AGV at the first position and at the second position and coordinate positions of each of the at least two fixed objects on a navigation map;
determining an actual change in orientation of the AGV from the first position to the second position based on the first orientation and the second orientation; and
validating the readings of the orientation sensor based on the actual change in orientation.

17. The non-transitory computer-readable medium of claim 16, wherein receiving the distance and the angle of observation of each of the at least two fixed objects comprises:
receiving an indication of each of the at least two fixed objects based on a reference distance and a reference angle of observation from the navigational map; and
identifying presence of each of the at least two fixed objects upon receiving the indication by comparing the distance and the angle of observation with the reference distance and the reference angle of observation respectively.

18. The non-transitory computer-readable medium of claim 16, wherein validating comprises:
   determining a change in orientation of the AGV from the first position to the second position based on a first reading of the orientation sensor at the first position and a second reading of the orientation sensor at the second position; and
   comparing the change in orientation with the actual change in orientation.

19. The non-transitory computer-readable medium of claim 16, wherein the computer-executable instructions are further configured for:
   identifying an inaccuracy in the readings of the orientation sensor based on the validation; and
   at least one of notifying a user with respect to the identified inaccuracy, or initiating a corrective action based on the identified inaccuracy.

20. The non-transitory computer-readable medium of claim 16, wherein the computer-executable instructions are further configured for performing validation for each of a plurality of variation ranges of the orientation sensor for a pre-determined number of times during a periodic monitoring cycle.

* * * * *